UNITED STATES PATENT OFFICE.

LEON W. EBERLIN AND SAMUEL E. SHEPPARD, OF ROCHESTER, NEW YORK, ASSIGNORS TO EASTMAN KODAK COMPANY, OF ROCHESTER, NEW YORK, A CORPORATION OF NEW YORK.

LIGHT-DIFFUSING MEDIUM AND METHOD OF MAKING THE SAME.

1,421,924.     Specification of Letters Patent.     Patented July 4, 1922.

No Drawing.    Application filed December 13, 1920. Serial No. 430,300.

*To all whom it may concern:*

Be it known that we, LEON W. EBERLIN and SAMUEL E. SHEPPARD, citizen of the United States of America and subject of the King of Great Britain, respectively, residing at Rochester, in the county of Monroe and State of New York, have invented certain new and useful Improvements in Light-Diffusing Mediums and Methods of Making the Same, of which the following is a full, clear, and exact specification.

This invention relates to a light-diffusing medium and a process of preparing the same. More particularly it is concerned with a composition for the preparation of light diffusing screens, together with a way of controlling the diffusing properties of such composition and screen.

One object of this invention is to provide a readily prepared and inexpensive composition for the manufacture of light diffusing screens which may be used where ground glass is now employed in cameras, finders, and other optical instruments. Another object of the invention is to provide a composition in which the light diffusing particles are partially hydrolyzed and swollen. Another object is to provide a composition in which the light diffusing particles are cemented to the translucid medium in which they are suspended. Still another object is to provide a composition in which the light diffusing properties of the suspended particles are controlled. Another object of our invention is to provide a simple, inexpensive, and easily controlled process for making such compositions and reproducing them with the desired qualities. Still another object of our invention is to provide a layer in a light diffusing screen which will have the desired light transmitting qualities, will adhere strongly to its support, and will be readily reproducible under commercial conditions. Other objects will hereinafter appear.

We have found that a composition having the hereinabove mentioned desirable properties may be prepared from mixtures of certain soluble silicates, such as water glass, with amylaceous particles, such as starch grains. By using the proper amount of solvent, this composition may be readily applied to a support, using commercial methods, so as to make an advantageous, uniform, and homogeneous substitute for ground glass of improved quality. We have also found that the composition and diffusing layers made therefrom may be pre-controlled by heating the original solution to the proper temperature.

We will now describe the preferred embodiment of our invention. The amylaceous particles in the form of starch of any usual kind are made into a cream or paste by admixture with cold water. Where a particularly fine grained screen is to be made from the composition, we prefer to use corn or rice starch, and the latter may be sifted or otherwise separated to procure particles that are smaller than a definite size, that is, will all pass through a screen of the desired mesh. In general, however, we find that ordinary rice starch is excellent.

The starchy cream or paste is next uniformly distributed through or mixed with a silicate or water glass solution by stirring or other suitable mechanical agitation. While we ordinarily use so-called soda water glass of commerce, water soluble silicates of potassium and other alkaline metals may be likewise used. The water glass solution which we employ may have a specific gravity in the neighborhood of 1.3 at 60° F., and the total solids may be about 30%. Another means of identifying it is to note its Engler viscosity, which may usefully be approximatly 2.1 at 70° F.

We find that the homogenization of the suspension or mixture of water glass and starch may be facilitated by using an atomizing emulsifier of known type. When the control of the size of light diffusing particles or grains is important, all grains above a certain size may be removed by passing the mixture through a high speed centrifuge.

As an example of the proportions in which the ingredients may satisfactorily be combined, we note the following:

Rice starch 15 to 20 parts,
Water, 200 to 300 parts, and a
Strong water glass solution of the type indicated above, 100 parts.

The homogeneous suspension is then heated to a temperature which is variable, but in practice may be in the neighborhood of 170° F. In the presence of the residual alkali of the sodium silicate, the starch grains are swollen and probably partially hydrolyzed. Of course, an analogous action takes place when the other soluble silicates of that type are used. It may be that so-called sodium amylate is formed, but whether an actual chemical compound is formed, or whether the result is merely due to adsorption, the actual result is to very effectively cement the starch and siliceous material together, due to their interaction or formation of interacted material in the mixture. The effect on the starch grains is to control their light-transmitting or diffusing qualities,—in other words, altering their translucency. By varying the temperature and the time at which the heat treatment is prolonged, the translucency of the starch grains may be brought to any desired or predetermined degree. The duration of the heating is, therefore, best determined by a visual inspection of the milky suspension which is obtained by the above operations, the longer the heating the greater the translucency.

The liquid composition described above may be coated on glass, on flexible nitrocellulose film, or other suitable translucid bases, by the customary methods, such as by flowing over by hand, or spraying with an atomizer, such as is used for lacquering, or by application with rolls, etc. The spraying method is particularly suitable for applying the medium to glass and rigid bases, while the use of application rolls is advantageous with flexible film base. Nevertheless, the use of the composition is not confined to any particular coating method. The water glass causes the layer or coating to adhere to the glass, nitrocellulose, etc., very strongly, so that a durable diffusing screen or ground glass substitute is obtained. While for many purposes the light diffusing layer may be used alone, after it is properly dried, nevertheless it is very useful to cover it with a waterproofing varnish or lacquer, preferably transparent, when the screen is to be used under especially moist conditions.

Having thus described our invention, what we claim as new and desire to secure by Letters Patent is:

1. A composition of matter consisting of a mixture of a water soluble silicate and amylaceous particles.

2. A composition of matter comprising water glass and fine grained rice starch mixed therewith.

3. A composition of matter consisting of water glass and partially hydrolyzed and swollen starch grains in admixture therewith.

4. A composition of matter comprising a mixture of partially interacted amylaceous particles and water glass, the light diffusing quality of said mixture being dependent on the proportion of interacted material therein.

5. A composition of matter comprising water glass having starch particles admixed therewith and cemented thereto.

6. A flowable and sprayable composition consisting of water, water glass, and amylaceous particles.

7. A composition for making light diffusing coatings comprising 15 to 20 parts of rice starch, 200 to 300 parts of water, and 100 parts of a strong water glass solution.

8. In a light diffusing screen, a layer consisting of a translucid silicate containing admixed light diffusing amylaceous particles.

9. In a light diffusing screen, a layer consisting of water glass and starch grains in substantially uniform admixture.

10. In a light diffusing screen, a layer containing a mixture of starch grains and water glass partially interacted therewith, the light diffusing quality of said layer being dependent on the proportion of interacted material therein.

11. In the process of preparing a composition containing admixed water glass, water, and starch grains, the step of heating the mixture to partially hydrolyze and swell said grains.

12. In the process of preparing a composition containing admixed water glass, water, and starch grains, the step of heating said mixture to approximately 170° F.

13. In the process of preparing a composition for making light-diffusing screens, the step of heating a mixture of water glass, water, and starch grains, until the light diffusing qualities of said grains are suitably modified.

Signed at Rochester, New York, this 9th day of December, 1920.

LEON W. EBERLIN.
SAMUEL E. SHEPPARD.